United States Patent
Allen

[11] Patent Number: 6,095,542
[45] Date of Patent: Aug. 1, 2000

[54] LIGHT-WEIGHT BICYCLE CROWN CONTAINING LIGHTENING BORES

[75] Inventor: Kirk A. Allen, Valencia, Calif.

[73] Assignee: Answer Products, Inc., Valencia, Calif.

[21] Appl. No.: 09/253,774

[22] Filed: Feb. 22, 1999

[51] Int. Cl.[7] .................................................. B62K 19/30
[52] U.S. Cl. .......................... 280/276; 280/279; 280/280
[58] Field of Search ................................... 280/279, 280, 280/281.1, 288.3, 276

[56] References Cited

U.S. PATENT DOCUMENTS

| | | | |
|---|---|---|---|
| 4,887,828 | 12/1989 | Chpnan | 280/280 |
| 5,238,259 | 8/1993 | Wilson et al. . | |
| 5,284,352 | 2/1994 | Chen . | |
| 5,445,366 | 8/1995 | Shih et al. | 280/276 |
| 5,626,355 | 5/1997 | Voss . | |
| 5,725,226 | 3/1998 | Cabrerizo-Pariente | 280/276 |

FOREIGN PATENT DOCUMENTS

| | | | |
|---|---|---|---|
| 61199 | 6/1942 | Denmark | 280/280 |
| 348011 | 3/1905 | France | 280/276 |
| 798705 | 5/1936 | France | 280/280 |
| 832106 | 9/1938 | France | 280/280 |
| 55511 | 9/1952 | France | 280/276 |
| 21301 | 11/1894 | United Kingdom | 280/276 |

*Primary Examiner*—Anne Marie Boehler
*Attorney, Agent, or Firm*—Laubscher & Laubscher

[57] ABSTRACT

A light-weight bicycle crown includes a horizontal unitary body member having in longitudinal vertical cross-section an arched generally inverted U-shaped configuration including a center portion, a pair of generally downwardly extending leg portions, and a pair of end portions integral with the lower ends of the leg portions, respectively, the center portion containing a vertical center through bore for receiving the bicycle steering shaft, and the end portions containing vertical end through bores on opposite sides of the center bore for receiving the stanchions of the front fork shock absorber means, respectively, characterized by the provision of lightening bores that extend from the end bores longitudinally within the leg portions, respectively, the end bores terminating in closed end walls adjacent the center through bore. Preferably, the end walls of the lightening bores are concave, the lightening bores have an elliptical cross-sectional configuration, and the thickness of the crown leg portion surrounding each lightening bore is constant, thereby to achieve maximum structural strength with a minimum of total crown weight.

6 Claims, 2 Drawing Sheets

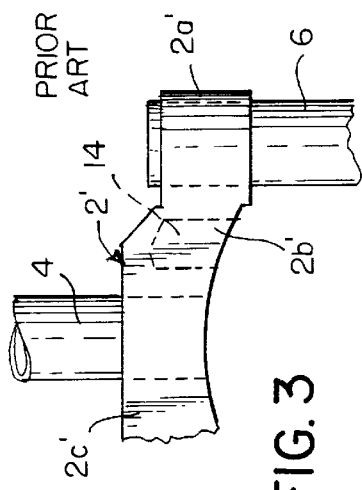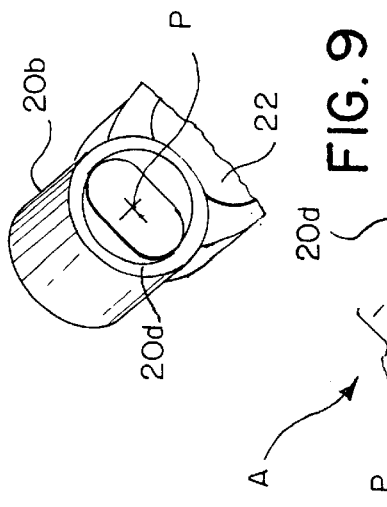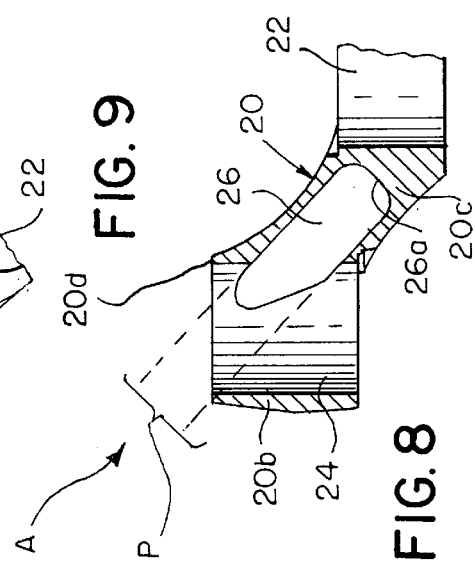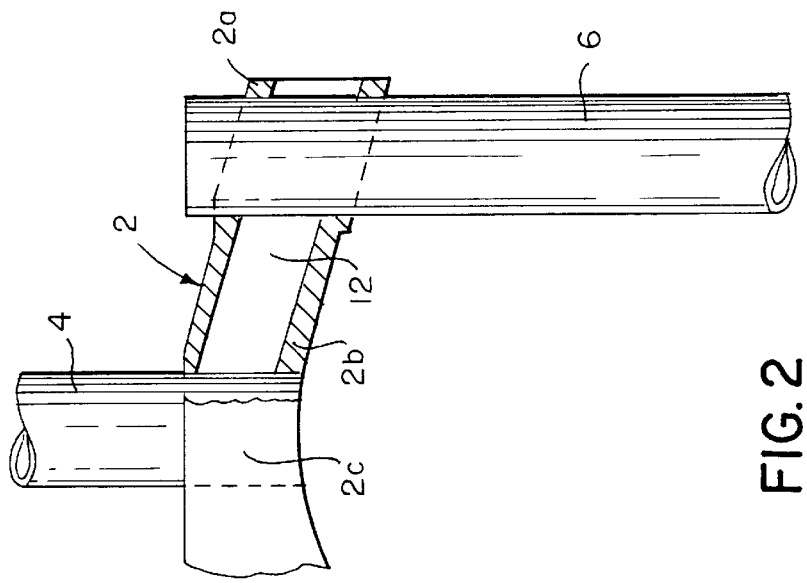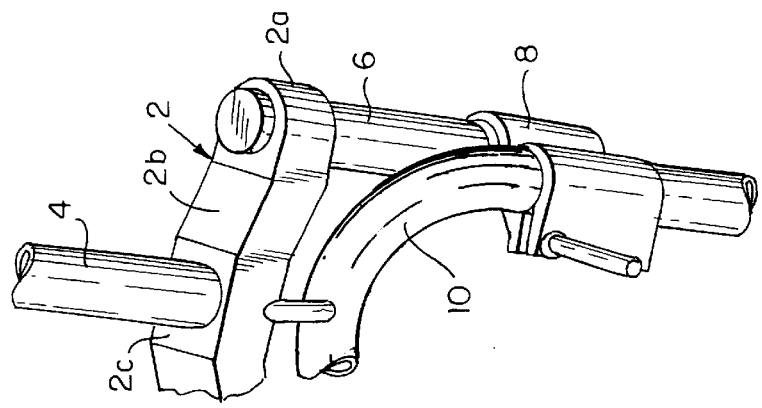

LIGHT-WEIGHT BICYCLE CROWN CONTAINING LIGHTENING BORES

BACKGROUND OF THE INVENTION

1. Field of the Invention

This invention relates to a light-weight bicycle crown having a horizontal inverted generally U-shaped longitudinal cross-sectional configuration including a center crown portion containing a vertical bore for receiving the bicycle steering shaft, and a pair of end portions containing vertical bores for receiving the stanchions of the front fork shock absorbers of the bicycle, respectively, characterized in that each of the crown leg portions that connect the end portions with the center portion contains a weight-reducing lightening bore that extends partially from the associated stanchion bore toward, but terminates in spaced relation to, the steering shaft bore.

2. Brief Description of the Prior Art

It is well known in the bicycle art to provide a front fork having a crown member that contains a first through bore for receiving the handlebar steering shaft, and a pair of second through bores arranged on opposite sides of the first bore for receiving the stanchions of the shock absorbers associated with the front fork of the bicycle. Examples of such known crown arrangements are shown in the patents to Chen et al U.S. Pat. No. 5,284,352, Wilson et al U.S. Pat. No. 5,238,259, and Voss et al U.S. Pat. No. 5,626,355.

Various attempts have been made in the bicycle art to reduce the weight of the bicycle components, thereby to increase the speed of operation and improve the handling and portability of the bicycle, and to reduce the cost of the components and thus the total cost of the bicycle. In the Voss et al patent, for example, it was proposed to provide lightening bores that extended from each end extremity of a hollow crown member completely across the associated crown end portion and the stanchion bore contained therein, and completely longitudinally through the associated leg connecting portion and terminating in communication with the steering shaft bore. The Voss et al patent also disclosed the provision of lightening recesses at various locations on the leg connecting portions of the crown member, thereby to reduce the total weight thereof. The drawback of such weight-reducing proposals is that the structural integrity of the hollow crown member is greatly reduced, thereby significantly weakening the crown member and adversely and dangerously affecting the critical strength of the bicycle front fork.

The present invention was developed to provide an improved light-weight bicycle crown member that avoids the above and other drawbacks of the known crown members of the prior art.

SUMMARY OF THE INVENTION

Accordingly, a primary object of the invention is to provide an improved light-weight horizontally-arranged bicycle crown including a pair of leg portions that connect a pair of end portions with a center portion that contains the vertical through bore that receives the handle bar steering shaft of the bicycle, said leg portions containing weight-reducing lightening bores that extend respectively from the associated vertical stanchion bores contained in the end portions partially in the direction of, but terminate in spaced relation to, said steering shaft bore.

According to a more specific object of the invention, the horizontally-arranged crown has an inverted, arched generally U-shaped longitudinal cross-sectional configuration with the crown center portion being connected with the two end portions being by a pair of downwardly inclined leg portions, the weight-reducing lightening bores extending from the stanchion bores contained in the end portions upwardly partially within the leg portions, respectively, in the direction of the center steering shaft bore. Preferably, the thickness of each leg portion surrounding the lightening bore is uniform throughout its circumference, thereby to achieve the maximum strength for resisting torsional forces in the crown.

According to another object of the invention, the angle of inclination of the leg portions and the lightening bores is such that the cross-sectional projection of each lightening bore on the bottom surface of the associated end portion falls completely within the vertical stanchion bore opening, thereby to simplify the formation of the lightening bores within the leg portions.

BRIEF DESCRIPTION OF THE DRAWINGS

Other objects and advantages of the invention will become apparent from a study of the following specification when viewed in the light of the accompanying drawings, in which:

FIG. 1 is a perspective detained view of a front fork arrangement for a bicycle including a crown member of the prior art, and FIGS. 2 and 3 are detailed front elevational views illustrating two proposals of the prior art for reducing the weight of the bicycle crown member;

FIG. 8 is a partly sectioned view taken along line 8—8 of FIG. 7; and

FIG. 9 is a detailed perspective view taken in the direction indicated by the arrow A in FIG. 8.

DETAILED DESCRIPTION

Figure 4:
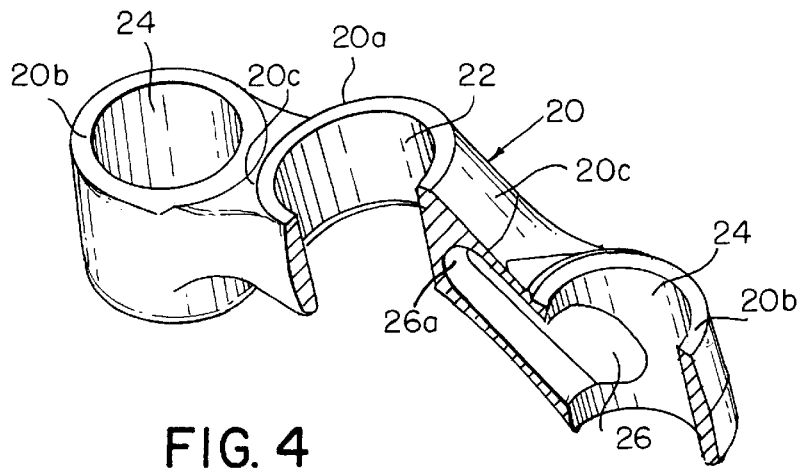
FIG. 4 is a front perspective, with certain parts broken away, of the improved light-weight crown member of the present invention.
Figure 5:
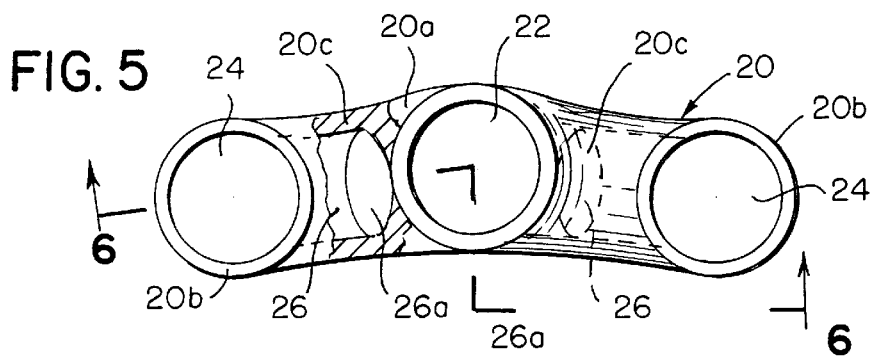
FIG. 5 is a top plan view of the crown member of FIG. 4.

Referring first to FIG. 1, it is known in the patented prior art, as evidenced by the Voss et U.S. Pat. No. 5,626,355, to provide a front fork for a bicycle including a crown member 2 for connecting a handlebar steering shaft 4 with the front fork upper stanchions 6, such as the stanchions of the shock absorbers of a mountain bike. The crown member is typically made of an aluminum alloy, either machined out of solid material or forged, with subsequent machining of the steerer and stanchion tube fitting surfaces. A brake bridge connector 8 serves to connect the ends of the hand brake bridge 10 to the stanchion. As shown in FIG. 2, in order to reduce the weight of the crown member 2, it has been proposed to provide a through bore 12 that extends longitudinally inwardly from each end extremity of the crown member successively through the end portion, transversely across the stanchion bore contained in the end portion 2a, and completely through the crown leg portion 2b, the lightening bore 12 being in communication with the center bore that receives the steering shaft 4. The problem with this design is that the lightening through bore 12 weakens the end portion 2a, the leg portion 2b, and the center portion 2c, thereby limiting the torsional stresses to which the crown may be subjected during use. In the prior art proposal of FIG. 3, the provision of a transverse lightening bore greatly weakens the leg portion 2b' of the crown 2', which weakening is most undesirable since it occurs at the exact location that the resistance to torsional forces is desired.

Figure 6:
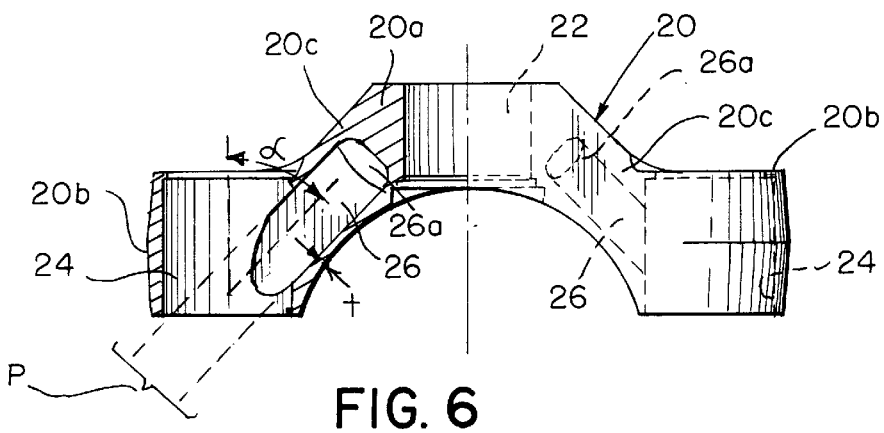
FIG. 6 is a partly sectioned view taken along line 6—6 of FIG. 5.
Figure 7:
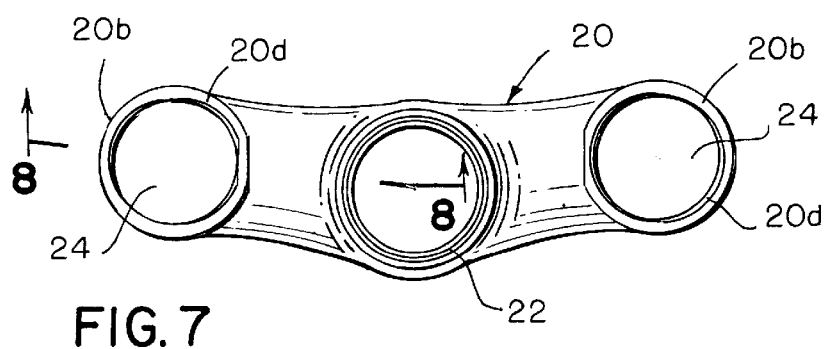
FIG. 7 is a bottom view of the crown member of FIG. 4.

Referring now to FIGS. 4–9, the crown member 20 of the present invention is formed of a metal alloy or synthetic plastic material and has an arched generally inverted V-shaped longitudinal cross-sectional configuration as best shown in FIG. 6. The crown member is of integral construction and includes a center portion 20a containing a vertical through bore 22 for receiving the bicycle steering shaft, a pair of end portions 20b containing the vertical stanchion-receiving through bores 24, and a pair of downwardly and outwardly inclined leg portions 20c that connect the center portion with the end portions, respectively.

In accordance with a characterizing feature of the invention, each of the crown leg portions contains a weight-reducing lightening bore 26 that extends inwardly from the associated stanchion bore 24 and terminates in a closed end wall 24a adjacent but spaced from the center steering shaft bore 22. The lightening bore has a generally elliptical cross-sectional configuration, and the wall of the leg portion surrounding the lightening bore has a constant thickness t (FIG. 6) which, together with the arched configuration of the crown member and the generally elliptical cross-sectional configuration of the lightening bore, affords maximum structural strength and resistance to the torsional forces to which the crown member is subjected during use. Furthermore, the improved design maintains maximum strength of the press fit connection between the steering shaft and the center steering bore 22. The counterbores are of a rectangular rounded cross-sectional shape that approximates the exterior shape of the crown. This produces a nearly constant wall thickness t between thecounter bore and the exterior of the crown. This optimizes structural strength and stiffness while minimizing weight.

It is important to note that in order to improve the manufacturability of the crown member, the projections of the elliptical cross-sectional profiles P of each lightenening bore 26 on the associated bottom surface 20d of the crown member end portion 20b is completely contained with the bottom opening of the associated stanchion bore 24. Thus, the crown member may be fabricated by any combination of billet raw material, machining, forging, and metal molding, or casting. Polishing and anodizing are also used to finish the crown.

While in accordance with the Patent Statutes the preferred forms and embodiments of the invention have been illustrated and described, it will be apparent to one skilled in the art that various changes may be made without deviating from the inventive concepts set forth above.

What is claimed is:

1. A bicycle crown for connecting the steering shaft of a bicycle with the stanchions of a pair of front fork shock absorbers, comprising:

(a) a unitary horizontally arranged crown body including in vertical longitudinal cross section a generally inverted U-shaped arched configuration having a center portion, a pair of end portions arranged on opposite sides of, and at a lower elevation than, said center portion, and a pair of angularly downwardly inclined leg portions connected between said center portion and said end portions, respectively;

(1) said center portion containing a vertical center bore for receiving the bicycle steering shaft;

(2) said end sections containing a pair of vertical end through bores for receiving the shock absorber stanchions, respectively, said end bores being arranged generally parallel with and on opposite sides of said center bore, respectively; and (b) means for reducing the weight of said crown body, including:

(1) at least one lightening bore extending at one end angularly from a first one of said center and end bores generally longitudinally partially into the adjacent leg portion of said crown body;

(2) said lightening bore terminating at its other end in a closed end wall adjacent and spaced from a second one of said bores;

(3) said lightening bore being so angularly arranged relative to said first bore that when the cross-sectional profile of said lightening bore is projected on the plane containing the opening at one end of said first bore, said profile is contained solely within said opening.

2. A bicycle crown as defined in claim 1, wherein said lightening bore closed end wall is concave.

3. A bicycle crown as defined in claim 1, wherein a pair of said lightening bores are provided which extend longitudinally within the leg portions of said crown body, respectively.

4. A bicycle crown as defined in claim 3, wherein each of said lightening bores has an elliptical cross-sectional configuration.

5. A bicycle crown as defined in claim 4, wherein the cross-sectional configuration of each of said crown leg portions is generally elliptical, each crown leg portion having in transverse cross-section a thickness dimension between the outer peripheral surface of said leg portion and the wall surface of the associated lightening bore that is generally constant about the circumference of said lightening bore.

6. A bicycle crown as defined in claim 3, wherein said first bores are said end bores, and said lightening bores extend inwardly into said leg portions from said end bores toward said center bore, respectively.

* * * * *